March 25, 1958     M. H. GREENBLATT     2,828,425

PULSE AMPLITUDE ANALYZER

Filed June 1, 1955

INVENTOR.
Manuel H. Greenblatt
BY
ATTORNEY.

United States Patent Office 2,828,425
Patented Mar. 25, 1958

2,828,425

PULSE AMPLITUDE ANALYZER

Manuel H. Greenblatt, Princeton, N. J., assignor, by mesne assignments, to the United States of America as represented by the United States Atomic Energy Commission Application June 1, 1955, Serial No. 512,403

7 Claims. (Cl. 250—217)

This invention relates to pulse amplitude analyzers, and more particularly to novel apparatus for sorting and counting a series of randomly occurring pulses. A pulse amplitude analyzer embodying the present invention is particularly useful for identifying radioactive substances quickly, and for obtaining information concerning the energy spectra of these radioactive substances. In the process of radioactive substance identification, the pulses are derived from a scintillation counter exposed to the products of nuclear disintegration.

In several fields of investigation, particularly in that part of nuclear physics wherein energy spectra, such as are obtained from gamma rays, are of importance, it is necessary to analyze the amplitude distribution of a series of pulses. The average magnitude of each pulse corresponds to the energy of the nuclear radiation that caused the pulse.

An object of the present invention is to provide a novel pulse amplitude analyzer that does not require the use of relatively expensive components and/or circuits.

Another object of the present invention is to provide a novel pulse amplitude analyzer that is simple in construction and operation, easy and economical to manufacture, and highly efficient in use.

A further object of the present invention is to provide a novel pulse counter employing an oscilloscope, a luminous trace scanner and a second oscilloscope for displaying a representation of pulse energy.

According to the invention these and other objects and advantages are obtained in a pulse amplitude analyzer employing a main oscilloscope and an auxiliary oscilloscope. The pulses to be sorted and counted may be derived from a scintillation crystal detector, and are applied to the vertical deflection plates of the main oscilloscope in a manner whereby the horizontal sweep circuit is triggered by each incoming pulse. Thus, the pulses to be sorted and counted are displayed on the screen of the oscilloscope as light traces in substantially vertical alignment. By the vertical alignment of traces, as used herein and in the appended claims, is meant the alignment of pulse traces that are referred to the same base-line; and wherein each pulse trace starts at the same point on the screen of the oscilloscope. The horizontal sweep of the main oscilloscope is also free running at a rate which approximates the rate of the applied pulses, so that a base-line trace is provided on the screen. An opaque mask, formed with a linear slit therein, is disposed in front of the screen of the main oscilloscope in the manner whereby the slit permits light to pass through from the base-line trace and from the peaks, or apexes, of the aligned pulse traces. The screen of the main oscilloscope comprises a phosphor of relatively long persistence so that the intensity of each trace is a function of the number of traces superimposed thereon. The base-line trace and the apexes of the traces of the pulses of different amplitude are scanned at a uniform rate. Light from these traces are applied to a photoelectric device connected in a circuit to convert light signals into signal voltages. The output from the photoelectric device is applied to the vertical plates of the auxiliary oscilloscope. The horizontal sweep of the auxiliary oscilloscope is adjusted to substantially the frequency of scanning, and is adapted to be triggered by the derived pulse representing the base-line trace of the main oscilloscope. Points on the abscissa of the trace on the screen of the auxiliary oscilloscope represent the relative amplitude of the pulses to be sorted, and points on the ordinate represent the relative number of pulses counted during the time represented by one scan.

The novel features of the invention, as well as the invention itself, both as to its organization and method of operation, will be understood in detail from the following description, when considered in connection with the accompanying drawing, in which similar elements have similar reference numerals, and in which.

Figure 1:
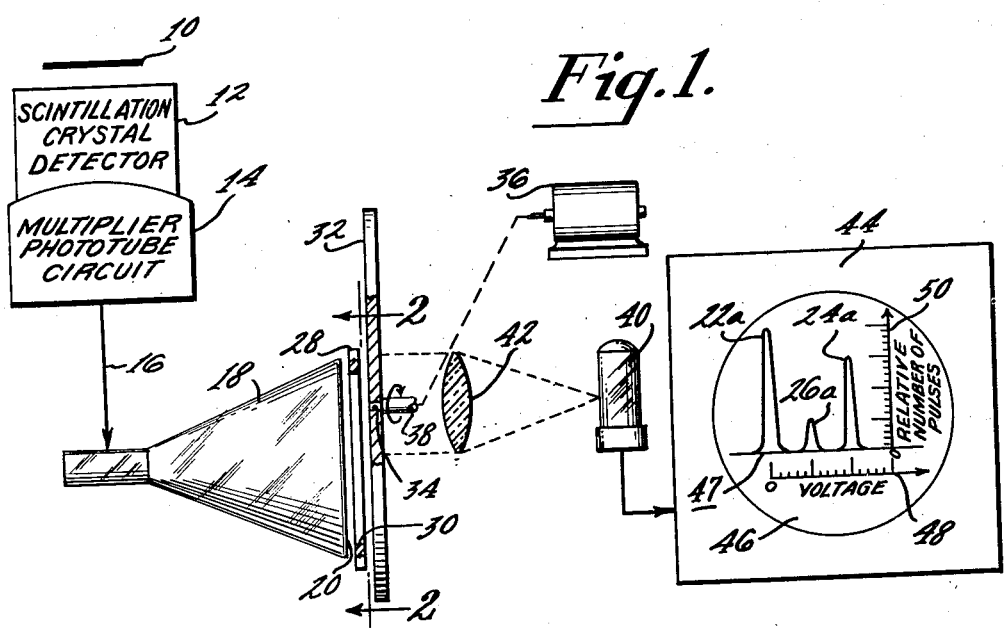
Fig. 1 is a schematic diagram of a pulse amplitude analyzer, with some parts broken away, in accordance with the present invention.

Referring now to Fig. 1, there is shown a pulse amplitude analyzer for sorting and counting a series of randomly occurring pulses derived from the radioactivity of a radioactive substance 10. Energy developed as a result of radioactivity of the radioactive substance 10, as for example, gamma rays, is directed toward a scintillation crystal detector 12 to cause the latter to scintillate. The scintillation crystal detector 12 may comprise a crystal of anthracene, sodium iodide, or the like, and operates in a manner well known in the art. The circuits shown herein in block diagram form are of conventional types known in the art, and, therefore, details of their construction and operation are omitted for the sake of simplicity.

The light energy from successive scintillations of the scintillation crystal detector 12 is converted into a series of voltage pulses by a multiplier phototube circuit 14, of conventional design, in a manner well known in the art. The pulses derived from the multiplier phototube circuit 14 are applied to the vertical plates of a main oscilloscope 18, of conventional design. The time constants of the multiplier phototube circuit 14 are such that each pulse passing through will have a substantially similar form.

The oscilloscope 18, represented herein as a cathode ray tube, is of conventional design and has a sweep circuit adapted to be triggered "on" by each incoming pulse. An oscilloscope of this type is represented by RCA Type WO-79B. Also, the Model 511AD oscilloscope manufactured by Tektronix is of this type. The phosphor screen 20 of the oscilloscope 18 has a relatively long persistence display time, and has the property of integrating the light output from a given area.

Figure 3:
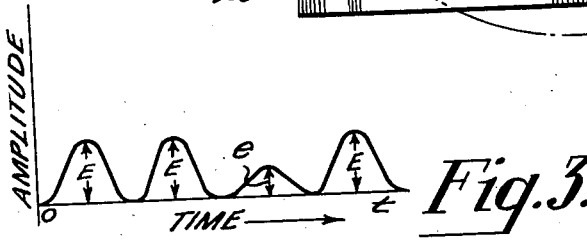
Fig. 3 shows a series of pulses obtained from a pulse source.

The means for displaying a series of pulses on the screen 20 of the main oscilloscope 18, in accordance with the present invention, will now be described. Let it be assumed, for example, that during a unit of time $t$, four discrete radiations of energy as shown in Fig. 3 emanate from the radioactive substance 10 as a result of its radioactivity. These four discrete radiations will cause four discrete scintillations to be detected by the scintillation crystal detector 12. Each of the scintillations is converted into a separate voltage pulse by the multiplier phototube circuit 14. Each pulse is applied to the vertical plates (not shown) of the oscilloscope 18, by way of connection 16 shown schematically in Fig. 1. Let it be assumed, also, that the four resulting voltage pulses comprise three pulses each having a voltage amplitude E, and one pulse having a voltage amplitude e, as shown in Fig. 3.

The oscilloscope 18 is adjusted to provide a base-line trace 22 (Fig. 2) on the screen 20, and also to be triggered by an incoming pulse, such as a pulse E or e. It will be understood that during the time $t$ three voltage traces 24, corresponding to three voltage pulses of amplitude E, and one voltage trace 26, corresponding to the voltage pulse e, will appear on the screen 20 of the main oscilloscope 18.

Figure 2:
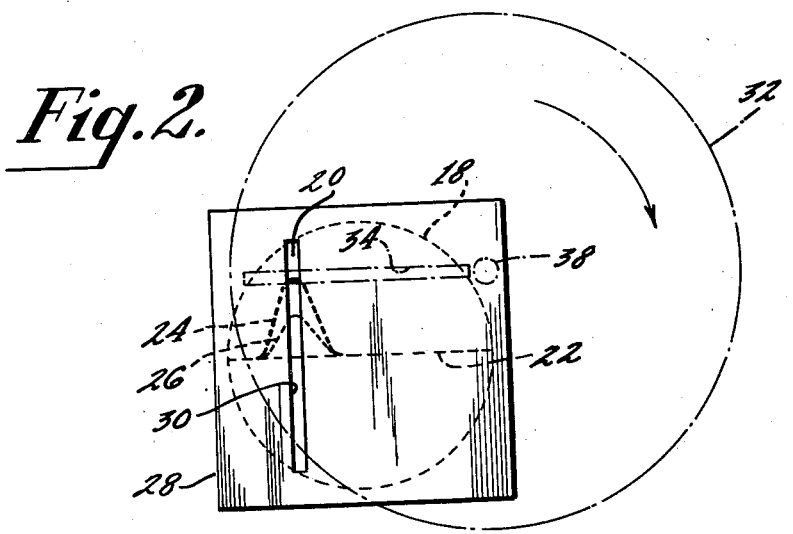
Fig. 2 is a cross-sectional view of a portion of the pulse amplitude analyzer taken along the line 2—2 in Fig. 1, as viewed in the direction of the arrows.

The traces 24 and 26, corresponding to the voltage pulses E and e, respectively, are both related to the same base-line trace 22 and start at the same point on the screen 20 of the main oscilloscope 18. The traces 24 and 26 are, therefore, in substantially vertical alignment with each other, as shown in Fig. 2. Under these conditions, the locus of the apexes of the traces 24 and 26 define a substantially straight line perpendicular to the base-line trace 22. An opaque mask 28 is positioned in front of the phosphor screen 20 of the oscilloscope 18 by any suitable means (not shown). The mask 28 is formed with a vertical slit 30 therein. The mask 28 is disposed so that the slit 30 will allow light from the base-line trace 22 and from the apexes of the traces 24 and 26 to pass therethrough.

The light persistence of the phosphor screen 20 should be long enough so that the intensity of any spot thereon is proportional to the electrons impinging thereon during the unit of time $t$. Thus, in the case illustrated, where three pulses of voltage amplitude E and one pulse of voltage amplitude e are displayed on the phosphor screen 20, during the unit of time $t$, the trace 24, averaged over the time $t$, will have three times the light intensity compared to the trace 26. Consequently, the apex of the trace 24 will have three times the light intensity of the apex of the trace 26, viewed through the slit 30 in the mask 28. It will now be understood that by viewing the phosphor screen 20 through the slit 30 in the mask 28, the number of traces above the first trace, which is the base-line trace 22, indicates the number of pulses of different amplitudes recorded during the time $t$; and the intensity of each trace is a function of the number of similar traces, or pulses, occurring during the unit of time $t$.

Means are provided to indicate graphically the number of pulses and the amplitudes thereof in a series of these pulses, during the unit of time $t$, in accordance with the present invention. To this end, there is provided a rotating scanning disc 32. This disc 32 appears in dot-dash outline in Fig. 2 of the drawing to facilitate clarity of illustration. The disc 32 has a radial slit 34 therein. The scanning disc 32 is disposed in front of and parallel to the mask 28, and is adapted to be rotated by a motor 36, mechanically linked to an axial shaft 38 fixed to the disc 32, in any suitable manner. The disc 32 is positioned so that the radial slit 34 therein will scan the vertical slit 30 of the mask 38 in a direction from the base-line trace 22 toward the apexes of the traces 26 and 24. Thus, discrete portions of the screen 20, visible through the slit 30 in the mask 28, are scanned at a substantially uniform rate by the radial slit 34 of the scanning disc 32. By proper proportioning of the disc 32 and the radial slit 34 therein, the slit 34 may scan the slit 30 in the mask 28 in substantially the direction of the slit 30 while the slit 34 is substantially perpendicular to the slit 30.

The disc 32 is rotated at a uniform rate by the motor 36 and the period of one rotation may be taken as the unit of time $t$. The persistence of the screen 20 of the main oscilloscope 18 should be on the order of the unit of time $t$. Light from the screen 20 of the oscilloscope 18, passing through the slits 30 and 34 of the mask 28 and scanning the disc 32, respectively, is focussed onto the photocathode (not shown) of a multiplier phototube 40 through a lens system 42, represented herein as a single lens. The circuitry for the multiplier phototube 40 is omitted because it may be conventional, and operates in a manner well known in the art. The voltage output of the multiplier phototube 40 is applied to the vertical plates (not shown) of an auxiliary oscilloscope 44. The horizontal sweep circuit (not shown) of the oscilloscope 44 is adjusted to be free running at substantially the frequency of rotation of the scanning disc 32. Under these conditions, the voltage pulse representing the light from the base-line trace 22, can synchronize the horizontal sweep of the auxiliary oscilloscope 44.

The sorting of the voltage pulses into groups according to amplitude, and the counting of the number of pulses in each group, in accordance with the present invention, will now be described. Let it be assumed that during the unit of time $t$ three pulses of amplitude E and one pulse of amplitude e produce the traces 24 and 26 above the base-line trace 22, in the manner described heretofore. It will also be understood that because of the persistence of the phosphor screen 20, the light intensity of the trace 24 is three times that of the trace 26, during one revolution of the disc 32. The disc 32 is caused to rotate by means of the motor 36 in a manner whereby the slit 34 of the disc 32 will scan the slit 30 of the mask 28 in a direction from the base-line trace 22 toward the apexes of the pulse traces 26 and 24. Light from the base-line trace 22 is converted into a pulse by the multiplier phototube 40. The trace of this pulse appears as a trace 22a on the screen 46 of the auxiliary oscilloscope 44. This is a relatively large pulse and is used to synchronize the horizontal sweep of the auxiliary oscilloscope 44 with the rotation of the disc 32. In a similar manner, light from the apex of the trace 26, on the screen 20 of the main oscilloscope 18, is converted to a pulse that will appear as a trace 26a on the screen 46 of the auxiliary oscilloscope 44. Similarly, light from the apex of the trace 24, on the screen 20 of the main oscilloscope 18, is converted to a pulse that will appear as a trace 24a, on the screen 46 of the auxiliary oscilloscope 44. Thus, for every revolution of the scanning disc 32, a trace 47, comprising the traces 22a, 26a and 24a, successively, will appear on the screen 46 of the auxiliary oscilloscope 44.

The length of the horizontal sweep of the auxiliary oscilloscope 44 may be calibrated in voltage, and the vertical distance from the base-line of the trace 47 may be calibrated in a relative number of pulses, as by scales 48 and 50, respectively. Hence, the voltage of the pulses in each group of pulses and the number of the pulses in each group of pulses may be determined directly from these scales. Thus, the trace 47, on the screen 46 of the auxiliary oscilloscope 44, indicates the information on the screen 20 of the main oscilloscope 18. Since each of the voltage pulses E is substantially two times the amplitude of the voltage pulse e, and the trace 24 indicates substantially twice the voltage amplitude of the trace 26, the trace 24a is substantially twice the distance from the base-line trace 22a as is the trace 26a, on the screen 46 of the auxiliary oscilloscope 44. The scale 48 indicates this information. Since there are three times as many voltage pulses of the amplitude E as there are of the voltage amplitude e, the light intensity of the trace 24 is three times the light intensity of the trace 26 on the screen 20 of the main oscilloscope 18. Thus, the height of the trace 24a is three times the height of the trace 26a on the screen 46 of the oscilloscope 44. The scale 50 indicates this information. Because different radioactive materials cause characteristic radiations per unit of time, the information thus obtained serves to identify the radioactive material 10 under observation.

What is claimed is:

1. In apparatus for sorting and counting a series of voltage pulse traces on the screen of a main oscilloscope, said main oscilloscope comprising means to display each of said voltage pulse traces from the same point on a base-line trace on said screen; means to scan discrete successive portions of said screen at a substantially uniform and periodic rate along a linear path extending along the locus of the apexes of said voltage pulse traces and passing through said base-line trace, means including a photoelectric device positioned to receive light from said successive portions of said screen during scanning and to convert said light into signal voltages, an auxiliary oscilloscope, and means connected between said last-mentioned means and said auxiliary oscilloscope to apply said signal voltages to said auxiliary oscilloscope.

2. In apparatus for sorting and counting a series of voltage pulse traces on the screen of a main oscilloscope, said main oscilloscope comprising means to display each of said voltage pulse traces from the same point on a base-line trace on said screen; means to scan discrete successive portions of said screen at a substantially uniform and periodic rate along a linear path extending along the locus of the apexes of said voltage pulse traces and passing through said base-line trace, means including a photoelectric device positioned to receive light from said successive portions of said screen during scanning and to convert said light into signal voltages, an auxiliary oscilloscope, and means connected between said last-mentioned means and said auxiliary oscilloscope to apply said signal voltages to said auxiliary oscilloscope, said screen having a light persistence equal to the time of at least one period of said periodic rate.

3. A pulse amplitude analyzer for sorting and counting a series of randomly occurring pulses of voltage comprising a main oscilloscope having a screen, said main oscilloscope comprising means to produce a base-line trace thereon and means for producing pulse traces on said screen in vertical alignment upon the occurrence of said pulses, means to scan a substantially linear portion of said screen periodically in a direction passing through said base-line trace and along the apexes of said pulse traces when said traces are on said screen, means comprising a photosensitive device positioned to receive light during said scanning, means in circuit with said device to convert said light into voltage signals, an auxiliary oscilloscope, and means to apply said last-mentioned voltage signals to said oscilloscope, said screen having a light persistence equal to the time of at least one period of said scanning means.

4. A pulse amplitude analyzer for sorting and counting a series of randomly occurring successive pulses of voltage comprising a main oscilloscope having a screen and means to produce a base-line trace thereon, means connected to said main oscilloscope to display each of said voltage pulses as a pulse trace on said screen, said main oscilloscope comprising means to display each of said pulse traces from the same point on said base-line trace whereby said pulse traces will be in substantially vertical alignment when on said screen, an opaque mask formed with a linear slit therein, said mask being disposed in front of said screen and parallel thereto, said linear slit extending along the locus of the apexes of said aligned pulse traces on said screen and crossing said base-line trace, means in front of said mask to scan successive discrete portions of said screen through said linear slit periodically, means to sample the intensity of light from said successive discrete portions of said screen during scanning, means positioned to receive said sampled light and to convert said sampled light into voltage signals, an auxiliary oscilloscope, and means to display said voltage signals received during a single scan on said auxiliary oscilloscope.

5. In a pulse amplitude analyzer of the type wherein a series of randomly occurring successive pulses of voltage are displayed on the screen of an oscilloscope as a plurality of pulse traces, each of said traces beginning from the same point on a base-line trace on said screen; the combination therewith of means for sorting and counting said pulses during a unit of time comprising a mask formed with a linear slit therein disposed in front of said screen, said linear slit extending across said base-line trace and in the path defined by the apexes of each of said pulse traces when on said screen, a disc formed with a radial slit therein positioned in front of and parallel to said mask in a manner whereby light from said screen will pass through both said linear slit and said radial slit, means to rotate said disc uniformly, a photo-electric device positioned in front of said disc in a manner to receive light from said screen passing through both said linear slit and said radial slit, means including said photo-electric device to convert the light received thereby into voltage signals, a second oscilloscope, and means to apply said last-mentioned voltage signals to said second oscilloscope.

6. Apparatus for sorting and counting a series of randomly occurring pulses of voltage comprising a first oscilloscope, said first oscilloscope comprising a screen and means for producing a pulse trace thereon on the occurrence of each voltage pulse applied thereto whereby to display each voltage pulse as a voltage trace, each of said voltage traces beginning at a fixed point on said screen of said oscilloscope, a mask formed with a linear slit therein, said linear slit extending along the apexes of said pulse traces when said pulse traces are on said screen, a disc formed with a radial slit therein, means to rotate said disc uniformly in a plane parallel to said mask in a manner whereby said radial slit passes in front of said linear slit, means comprising a photosensitive device positioned in front of said disc to receive light from said screen through both said linear slit and said radial slit and to convert said light into voltage signals, an auxiliary oscilloscope, means connecting said last-mentioned means to said auxiliary oscilloscope, and said auxiliary oscilloscope comprising a sweep circuit having a frequency adapted to be synchronized by selected ones of said voltage signals.

7. A pulse amplitude analyzer, for sorting and counting a series of randomly occurring successive pulses of voltage, comprising a main oscilloscope having a screen and means to produce a base-line trace thereon, means connected to said main oscilloscope to display each of said pulses as a pulse trace on said screen, each of said pulse traces having an apex and being in substantially vertical alignment with each other when on said screen, an opaque mask formed with a linear slit therein, said mask being disposed in front of said screen and parallel thereto, said linear slit extending parallel to the locus of said apexes of said aligned pulse traces on said screen and crossing said base-line trace, means to scan successive discrete portions of said screen uniformly through said linear slit in a direction from the base-line trace to the apexes of said pulse traces, means to sample the intensity of light from said base-line trace and from the apex of each of said pulse traces during scanning an auxiliary oscilloscope, and means connected between said sampling means and said auxiliary oscilloscope to convert said sampled light to voltage signals whereby to display said voltage signals as traces on said auxiliary oscilloscope as a function of their intensity and of their amplitude.

References Cited in the file of this patent

UNITED STATES PATENTS

| | | |
|---|---|---|
| 2,199,066 | Bernstein | Apr. 30, 1940 |
| 2,398,552 | Norton | Apr. 16, 1946 |
| 2,476,985 | Levy | July 26, 1949 |
| 2,617,042 | Wouters | Nov. 4, 1952 |